United States Patent [19]

Brunner et al.

[11] Patent Number: 5,377,890
[45] Date of Patent: Jan. 3, 1995

[54] ROOF RACK FOR VEHICLES

[75] Inventors: Harald Brunner, Solingen; Klaus Kolodziej; Karl-Heinz Lumpe, both of Wuppertal, all of Germany

[73] Assignee: Gebr. Happich GmbH, Germany

[21] Appl. No.: 210,214

[22] Filed: Mar. 18, 1994

[30] Foreign Application Priority Data

Apr. 24, 1993 [DE] Germany .................. 4313526

[51] Int. Cl.⁶ .................................. B60R 9/04
[52] U.S. Cl. .................... 224/321; 224/309; 224/315
[58] Field of Search ............. 224/309, 314, 315, 317, 224/321, 322, 325, 319, 320, 326

[56] References Cited

U.S. PATENT DOCUMENTS

| 4,406,386 | 9/1983 | Rasor et al. | 224/321 |
| 5,004,139 | 4/1991 | Storm et al. | 224/309 |

FOREIGN PATENT DOCUMENTS

| 2661378 | 4/1990 | France . | |
| 2939672 | 4/1981 | Germany | 224/321 |
| 2945950 | 5/1981 | Germany | 224/315 |
| 3029586 | 3/1982 | Germany | 224/315 |
| 3201409 | 9/1983 | Germany | 224/315 |
| 3641745 | 6/1986 | Germany | 224/315 |
| 3814799 | 5/1988 | Germany . | |
| 9108929 | 6/1991 | WIPO | 224/321 |

Primary Examiner—Henry J. Recla
Assistant Examiner—Gregory Vidovich
Attorney, Agent, or Firm—Ostrolenk, Faber, Gerb & Soffen

[57] ABSTRACT

A roof rack for vehicles having two rails and support feet bearing the rails. Each rail is developed as a hollow profile with a longitudinal channel which is open on the top and has undercuts. On each rail there is optionally arranged a profiled cover strip which can be detachably anchored in the longitudinal channel and extends over the length of the rail, or a profiled cover strip which extends over a first part of the length of the rail and a profiled support strip which extends over the second part of the length. The profiled support strips are anchored such that they can be swung into a position of use which connects the rails transversely to each other.

15 Claims, 5 Drawing Sheets

ROOF RACK FOR VEHICLES

BACKGROUND OF THE INVENTION

The present invention relates to a roof rack for vehicles, comprising two rails extending substantially parallel to each other and along the side edges of the surface of the roof and supporting feet which support the rails and each foot resting on the surface of the roof. The invention particularly concerns the construction of the rails and of transverse load supports or crosspieces extendable between the rails.

If deemed necessary, crosspieces can ordinarily be fastened to the rails of such a roof rack in order to support roof loads. When they are not in use, the crosspieces are usually removed and held available. Perhaps the crosspieces are also carried in the vehicle, which may, however, present space problems.

Federal Republic of Germany 38 14 799 C2 publication discloses a vehicle body with a roof and having a rack for a roof luggage carrier which is fastened on the roof. The rack includes two rails which extend substantially in the direction of vehicle travel and are at least approximately parallel to each other. Individual support bars are arranged between the rails. The bars can be removed from their positions of use when the roof luggage carrier is not in use. In this arrangement, the rails have chambers which receive the support bars when they are not needed.

This arrangement makes the support bars always available without their taking up space within the vehicle. In the luggage carrier, in this German publication, support bars must necessarily be clamped on the rails, which is not always desired. In addition, the distance between the support bars along the rails is not variable.

SUMMARY OF THE INVENTION

The present invention is based on a roof rack of the abovementioned type. The object is to develop the rack such that it is suitable in like manner for different requirements and to overcome some of the above noted limitations of prior art luggage carriers.

In the invention, each rail of the roof rack is developed as a hollow profile having a longitudinal channel which is open on top and its open top has undercuts. Optionally, the rail carries a profiled cover strip which extends over the length of the rail and can be detachably anchored in the longitudinal channel, or the rail carries a profiled cover strip which extends over a first partial length of the rail and a profiled support strip which extends over a second partial length of the rail. After loosening of anchoring means provided at the end regions of the profiled strips, the profiled support strips of the two rails can be swung from their positions of non-use, in which they extend in the direction of the respective rail, into their positions of use, which connects the rails transversely to each other. The support strips can also be displaced along the respective rails enabling adjustment of their spacing. The support strips are fastened to the rails at any selected location therealong by tightening respective anchoring means.

The invention makes it possible for the automobile or vehicle manufacturer to provide vehicles uniformly with a roof rack, as is frequently desirable for stylistic reasons. For this purpose, a first low cost version can be offered without integrated profiled support strips, and a second version, possibly sold at a higher price, can be offered, with integrated profiled support strips. The visual appearance in the two cases is practically the same. If the buyer decides in favor of the first, less expensive version, he will have the possibility of upgrading subsequently, since the rails of the two versions are developed identically. Equipping the roof rack of the invention with integrated profiled support strips offers the advantage that they can always be carried along without taking up any space, and this can be done extremely attractively visually. Another advantage is rapid and easy assembly upon bringing the profiled support strips out of their positions of non-use into their positions of use, and vice versa. Furthermore, it is particularly advantageous to be able to continuously adjust the distance between the profiled support strips over the length of the rails.

One embodiment is described in further detail below with reference to the accompanying drawings.

DESCRIPTION OF A PREFERRED EMBODIMENT

Figure 1:
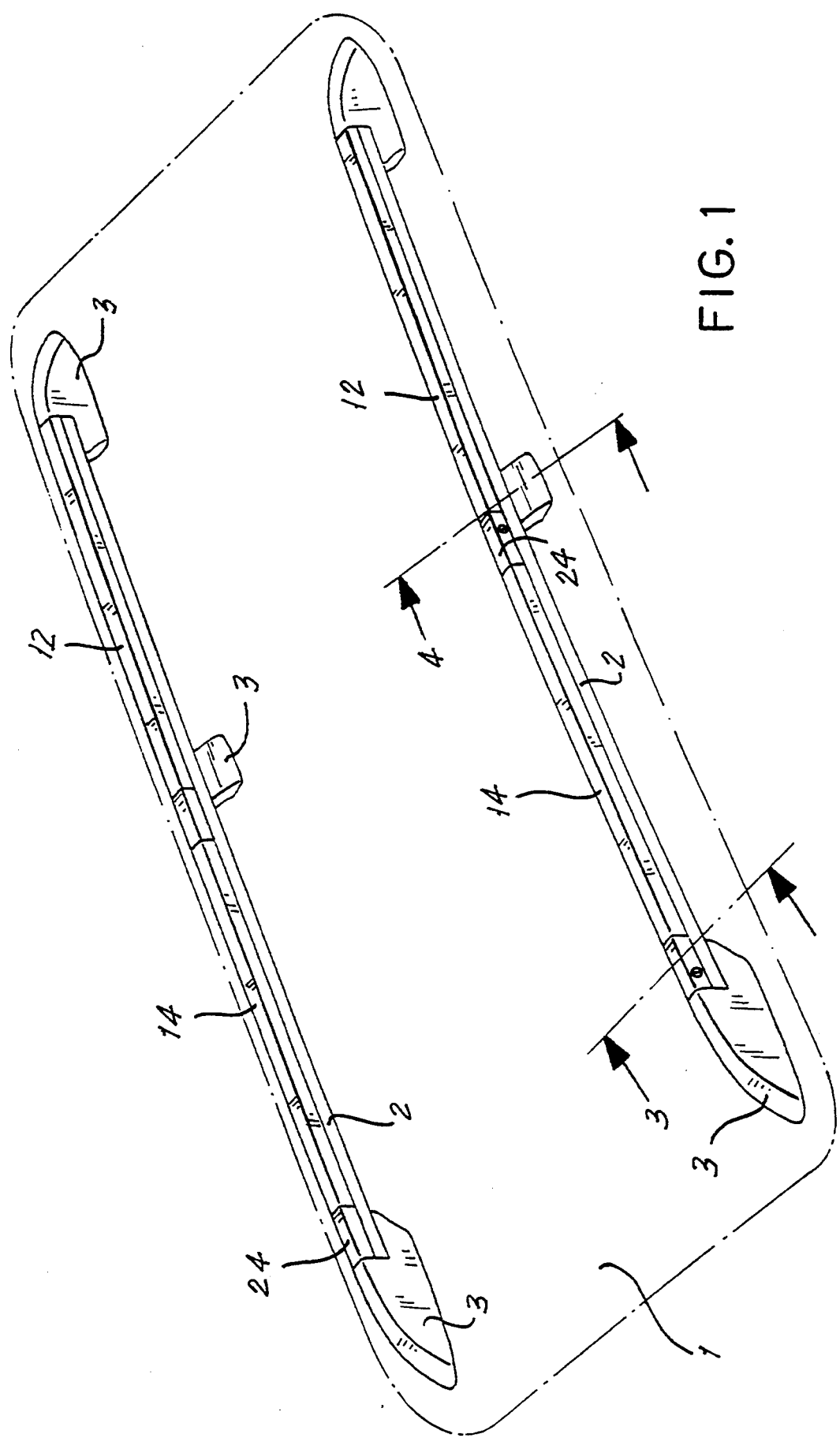
FIG. 1 shows a roof rack arrangement on a car roof with profiled support strips in the position of non-use.
Figure 2:
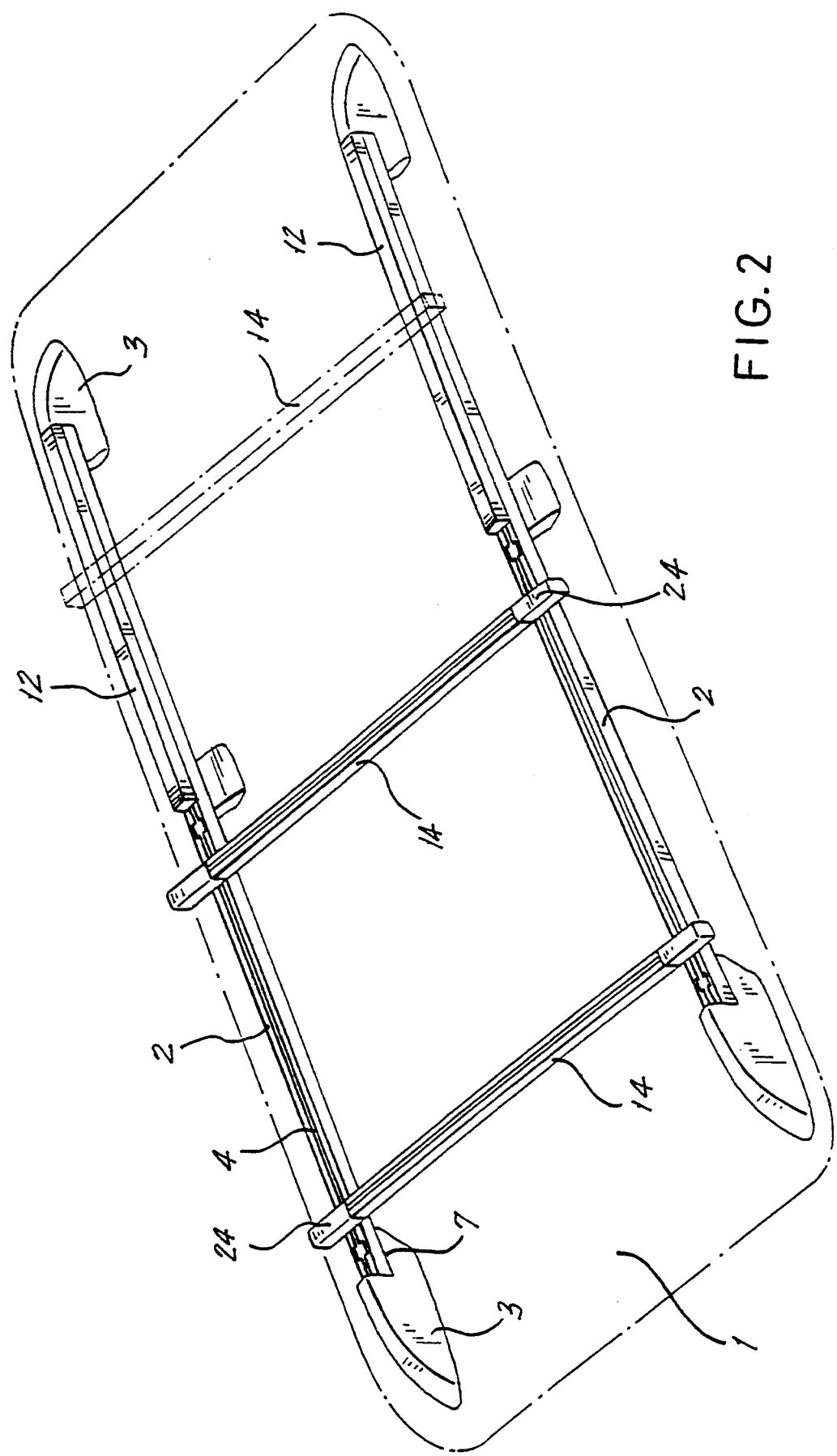
FIG. 2 shows the roof rack arrangement of FIG. 1 with the profiled support strips in the position of use.

In FIGS. 1 and 2, a car roof 1 is indicated by a dot-dash line on which two rails 2 are arranged at least approximately parallel to each other along the side edges of the surface of the roof. The rails 2 are supported spaced from the surface of the roof by support feet 3 which are fastened at their bottom end to the car roof 1 and at their top end to the rails 2.

Figure 4:
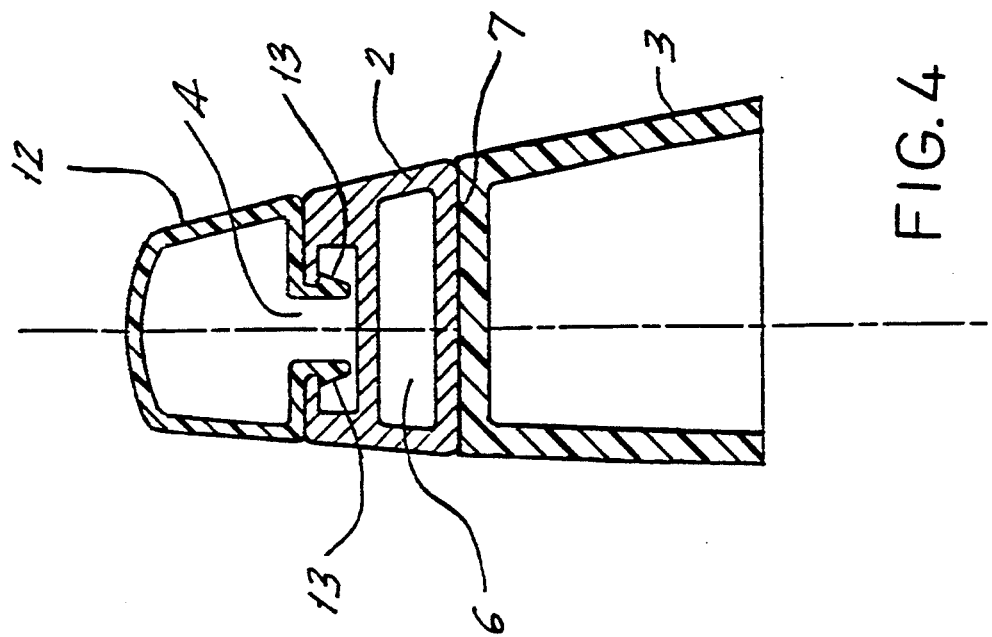
FIG. 4 is a section approximately along the line IV—IV of FIG. 1.
Figure 5:
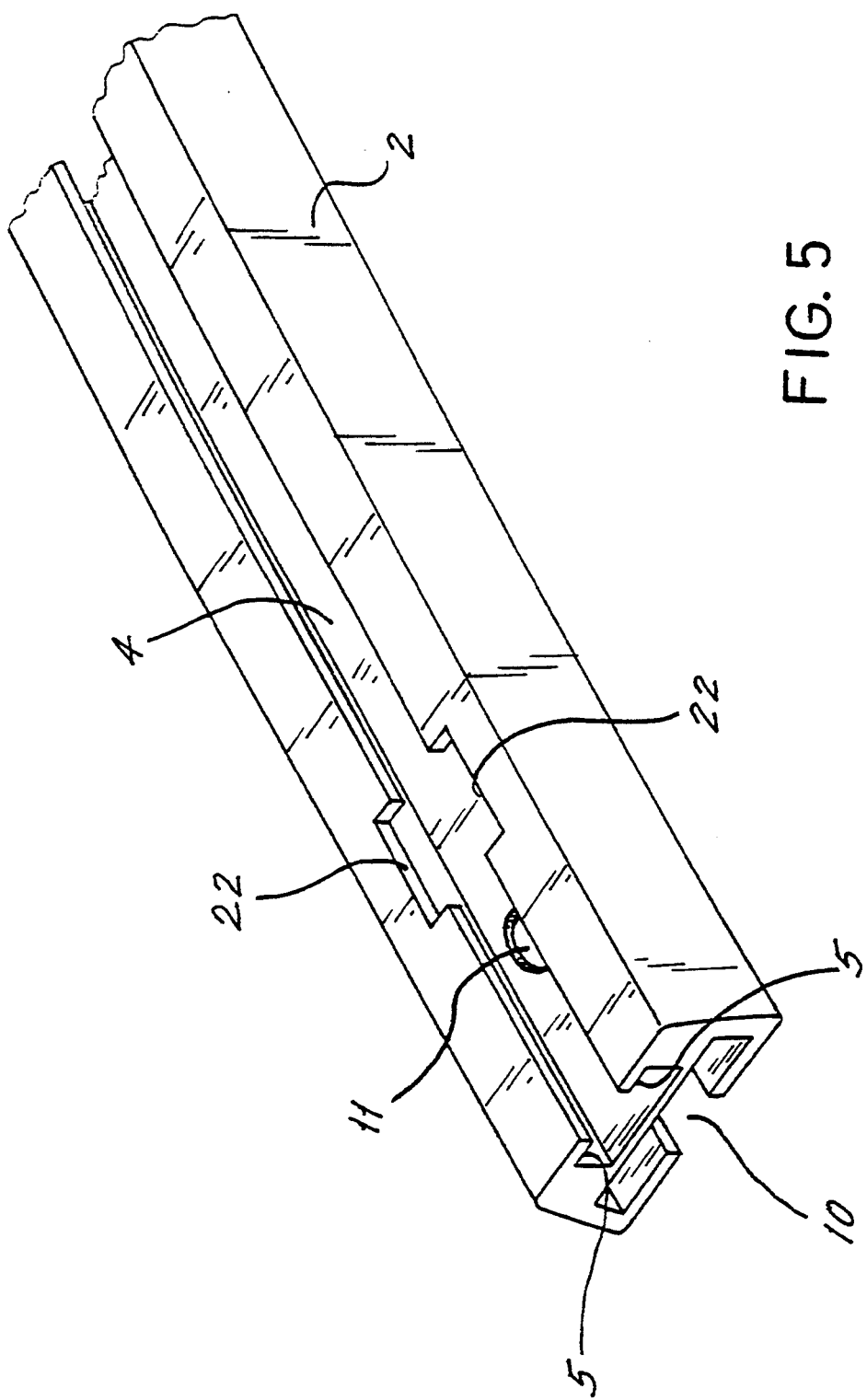
FIG. 5 shows the end region of a rail of the rack.
Figure 6:
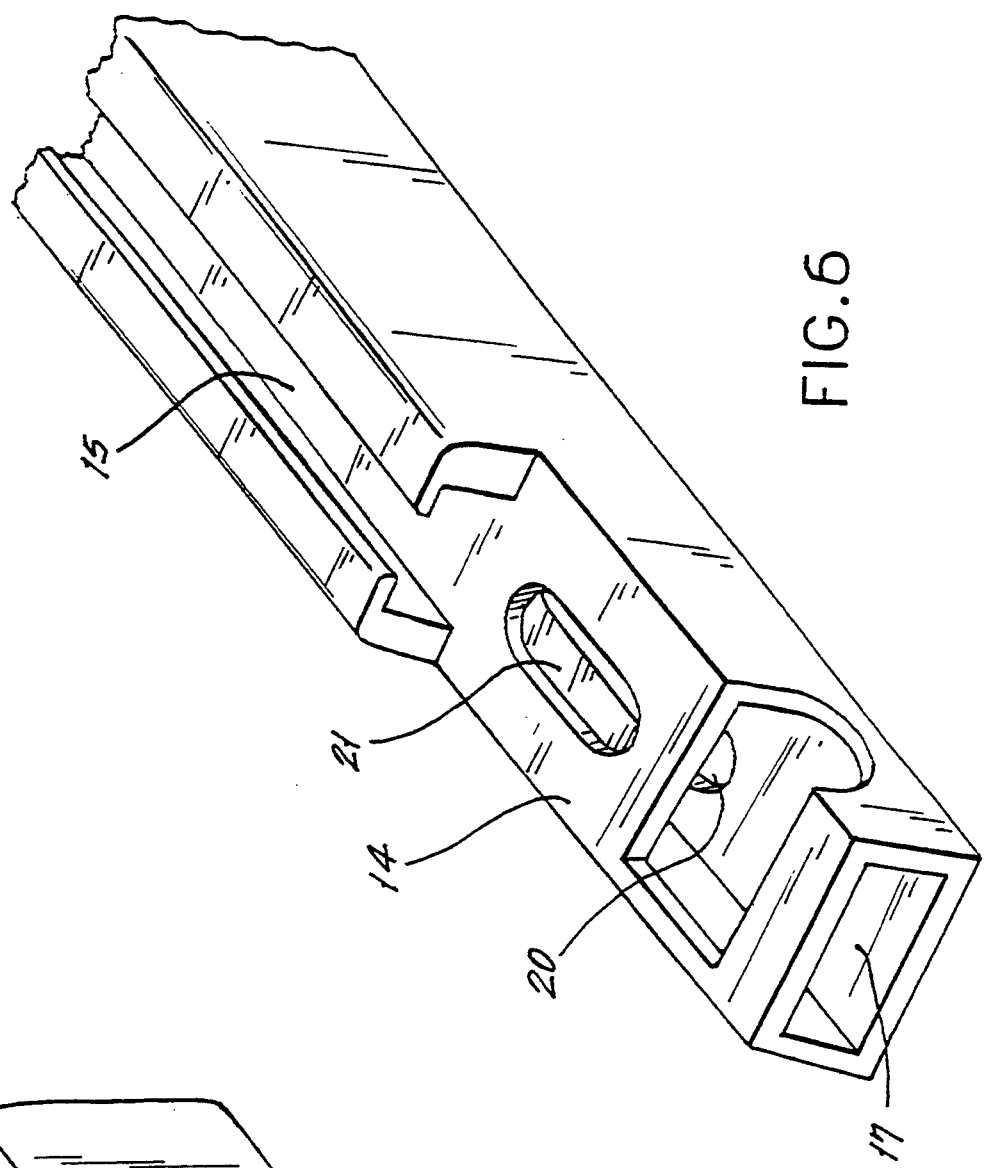
FIG. 6 shows the end region of a profiled support strip of the rack.
Figure 7:
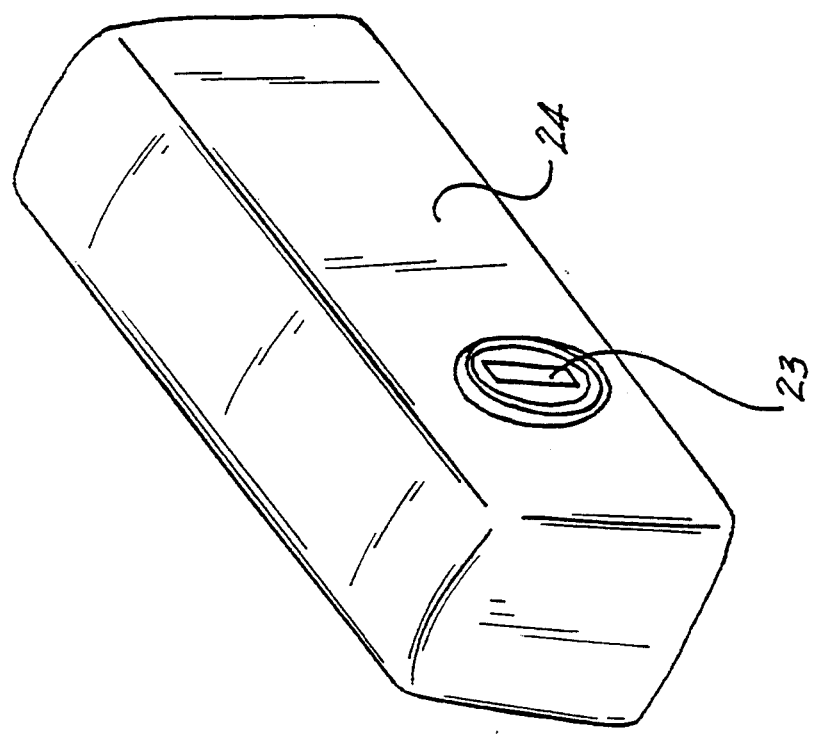
FIG. 7 shows an end cap for arrangement on the profiled support strip.

As shown in FIGS. 4 and 5, each rail 2 is developed as a hollow profile with a longitudinal channel 4 which is open toward the top, and the top has undercuts 5 at the edges of the opening. Each rail 2 furthermore has a substantially closed longitudinal channel 6 which reduces the amount of material required and the weight of the rail. The rails 2 are generally extruded profiles of light metal. Their opposite end regions and, particularly in the case of a relatively long rack, their central regions lie, on a support surface 7 developed on top of the support feet 3. The end support feet are step-shaped (see FIG. 1), so that the rails 2 also have their ends supported in each case on the steps of the support feet 3.

Figure 3:
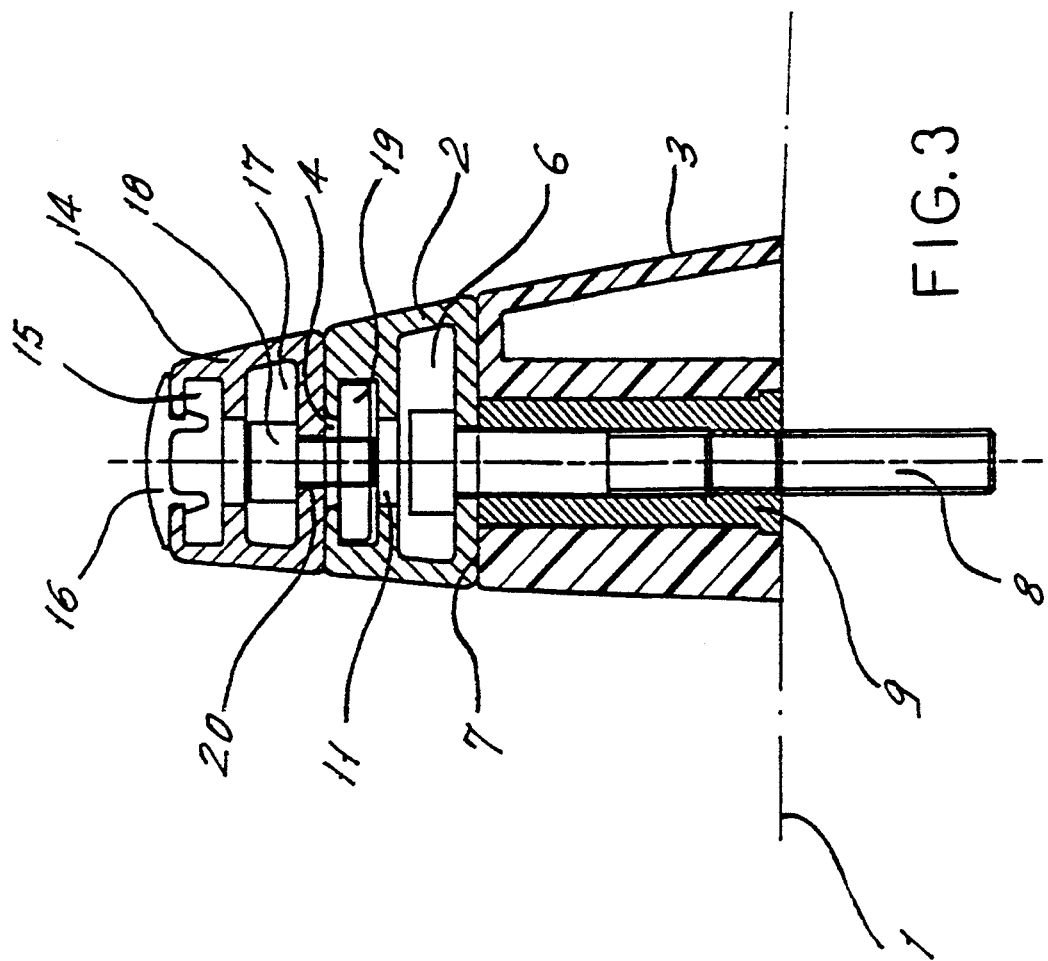
FIG. 3 is a section approximately along the line III—III of FIG. 1.

Each rail 2 can be fastened on a support foot 3, as shown in FIG. 3, in each case by means of a screw 8. For this purpose, the support feet 3 are provided with a threaded sleeve 9 embedded therein. For mounting a rail, the screw 8 is passed through a slot 10 which is provided in each rail 2 and is screwed into the threaded sleeve by means of a screwdriver which is passed through a hole 11 in the rail 2. The head of the screw 8 tests on the bottom wall of the longitudinal channel 6. The free end of each screw 8 which extends out of the support foot 3 passes through a hole in the car roof and through a support structure (not shown) arranged below the roof which serves to receive a fastening nut (not shown).

A roof rack including the rail 2 and the support feet 3 can be supplemented, for instance, with a profiled cover strip 12 which is arranged on the rail 2 and extends over its length (see FIGS. 2 and 4). The profiled cover strip 12 can in this connection be an extruded hollow chamber profile of plastic or rubber with detent noses 13 integrally formed on the profile which snap into the longitudinal channel 4 and engage beneath the undercuts 5 at the edges of the opening into the top of the channel. It is obvious that such a profiled cover strip 12, as shown particularly in FIG. 4, can be produced easily and at low cost, is easy to mount and remove and imparts a pleasing appearance to the rack.

However, a rack can be supplemented in the manner that a profiled cover strip 12 extends as shown in FIGS. 1 and 2, over only a part of the length of the rail 2, while the remaining part of the length of the rail is covered by a profiled support strip 14. The profiled support strip 14 is preferably developed as a metallic extrusion and is fastened in each case on the corresponding rail 2 in such a manner that it extends optionally in the longitudinal direction of the rail (FIG. 1) or transversely of the rail (FIG. 2). In the latter position, it produces a transverse connection between the two rails 2 arranged on the car roof 1. FIG. 2, accordingly, shows the arrangement of the profiled support strips 14 in the position of use intended to receive roof loads. Although a respective profiled strip 14 is shown on each rail, there may be such a strip on only one rail, since in its transverse position, the profiled strip may extend to both rails.

Each profiled support strip 14 is developed, comparably to the rails 2, as a hollow profile with an upwardly open longitudinal channel 15 having undercuts to receive attachment or object support parts, such as a bicycle holder, a surfboard holder and the like, or when the support strip is not in use, for clipping therein of the profiled cover strip 16. Each profiled support strip 14 also has a second longitudinal channel 17 through it which saves weight and material.

Screws 18 attach the support strips 14 to the rails 2. The screws 18 rest against the support strips 14 and engage in blocks or clamping pieces 19 which rest on the rails 2. The heads of the screws 18 rest on the bottom wall of the longitudinal channel 17 and pass through a slot 20 in that wall. The screws 18 are accessible from above through a slot 21 which is present in the bottom wall of the longitudinal channel 15. For attaching a profiled support strip, therefore, the screws 18 which engage in the threaded hole in the clamping piece 19 need merely be tightened, which pulls the clamping pieces 19 against the undercuts in the longitudinal channel 15.

To swing the profiled support strips 14 from their position of non-use (FIG. 1) into the position of use (FIG. 2), first the screws 18 are loosened. The clamping piece 19 adjacent the end of each profiled support strip 14 which is to be swung is then pushed along the channel 4 and is then moved out through one of the widened openings 22 in the longitudinal channel 4 and is introduced again through a corresponding widened opening in the longitudinal channel 4 of the opposite rail. After aligning and tightening the screws 18 the repositioned clamping pieces, an absolutely reliable and stable position of use for the profiled support strips 14 is present. There is also the particular advantage that the profiled support strips 14 are continuously displaceable over the entire length of the rails 2 and can be fastened to the rails 2 at any desired distance from each other, so that particularly short or particularly long roof loads can be placed on the profiled support strips 14. If the profiled support strips 14 are to be arranged particularly far from each other on the rails, as indicated in dash-dot lines in FIG. 2, temporary removal of the profiled cover strips 12 is of course necessary.

For antitheft protection for the profiled support strips 14 and for the add-on parts possibly present thereon, end caps 24 are provided. Each cap has a lock 23 for locking the cap to the profiled support strip. They are arranged in known manner in the end region of each profiled support strip. They are of a length to cover the screw 18 and the end of the rail, helping to prevent removal of the support strips 14.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A roof rack for placement on the roof of a vehicle, the rack comprising two rails extending substantially parallel to each other along the sides of the roof, each rail having a top and a bottom side; support feet beneath and connected to the bottom sides of the rails for supporting the rails on the roof surface;

each rail comprising a hollow profile extending in the longitudinal direction of the rail and having a longitudinal channel which opens on the top side of the rail and extends in the longitudinal direction of the rail;

a profiled support strip extending over at least part of the length of one of the respective rails, the profiled support strip having opposing end regions;

anchoring means at one of the end regions of each profiled support strip for anchoring the support strip to the respective rail in one of the directions of either extending along the length of the respective rail or transversely of the respective rail and between the rails, the anchoring means being loosenable and securable for enabling the profiled support strip to be swung between the respective directions, the anchored end region of the profiled support strip engaging the respective rail in a manner for enabling the anchoring means and the respective anchored end region of the support strip to be displaced longitudinally along the respective rail and to be anchored at a selected location along the respective rail by securing the anchoring means to the respective rail.

2. The roof rack of claim 1, wherein the profiled support strip is of such length that it extends from the anchoring means at the respective rail to the other rail, and second anchoring means at the other rail for securing the other of said end regions of the support strip at the other rail.

3. The roof rack of claim 2, wherein the profiled support strip extends over a first partial length of the respective rail;

a second profiled cover strip extending over a different respective partial length of the respective rail, and means for detachably anchoring the profiled cover strip to the respective rail.

4. The roof rack of claim 2, wherein each profiled support strip comprises a hollow profile and a top facing away from the rail, said top of said support strip including an open longitudinal channel extending therealong and opening at the top of the profiled support strip, whereby add on parts may be applied to the profiled support strip at the top;

the profiled support strip having end caps arranged at the end regions of the profiled support strip, the end caps being of such size and the anchoring means for the support strip on the rail being so placed that the end caps cover over and serve as an anti-theft protection for the ends of the profiled support strip and for the anchoring means.

5. The roof rack of claim 4, wherein the end caps have respective locks thereon for locking the end caps to the profiled support strip.

6. The roof rack of claim 4, further comprising a profiled cover strip supported in the longitudinal channel of the profiled support strips.

7. The roof rack of claim 6, wherein the longitudinal channel of the profiled support strip has undercuts for receiving and supporting add on parts and the profiled cover strip therein.

8. The roof rack of claim 1, wherein the profiled support strip extends over a first partial length of the respective rail;

a second profiled cover strip extending over a different second respective partial length of the respective rail, and means for detachably anchoring the profiled cover strip to the respective rail.

9. The roof rack of claim 1, wherein the open top of each of the rails has undercuts which define the edges of the respective channel therein and the profiled support strip being connected to the rail at the undercuts for removable support of the profiled support strip at the rail.

10. The roof rack of claim 9, wherein the anchoring means for the profiled support strip comprises a respective clamping piece received in and displaceable along the longitudinal channel of the respective rail, and a clamping element which engages the clamping piece and draws the clamping piece against the undercuts to anchor the profiled support strip to the rail.

11. The roof rack of claim 10, wherein the clamping piece has an internally threaded hole through it and the clamping element comprises a headed screw having a threaded shank which is received in the threaded hole of the clamping piece, and a hole provided in the profiled support strip through which the screw shank passes; the screw having a head which engages the profiled support strip.

12. The roof rack of claim 11, wherein the hole in the profiled support strip through which the screw passes is in the form of a longitudinally elongated slot.

13. The roof rack of claim 12, wherein each longitudinal channel has respectively spaced apart widened openings therein sized for enabling insertion and removal of the clamping piece from the channel.

14. The roof rack of claim 10, wherein each longitudinal channel has respectively spaced apart widened openings therein sized for enabling insertion and removal of the clamping piece from the channel.

15. The roof rack of claim 10, wherein each profiled support strip comprises a hollow profile and a top facing away from the rail, said top of said support strip including an open longitudinal channel extending therealong and opening at the top of the profiled support strip, whereby add on parts may be applied to the profiled support strip at the top;

the profiled support strip having end caps arranged at the end regions of the profiled support strip, the end caps being of such size and extending along the rail sufficiently and the anchoring means for the support strip on the rail being so placed that the end caps cover over and serve as an anti-theft protection for the ends of the profiled support strip and for the anchoring means.

* * * * *